United States Patent [19]

De Bruycker et al.

[11] Patent Number: 4,982,054

[45] Date of Patent: Jan. 1, 1991

[54] TELECOMMUNICATIONS PEDESTAL CLOSURE WITH ENVIRONMENTAL CONTROL LINER

[75] Inventors: Erwin De Bruycker, Cary; Mike Horan, Angier; Eric Bierlein; Floyd Cook, both of Cary, all of N.C.

[73] Assignee: Raychem Corporation, Menlo Park, Calif.

[21] Appl. No.: 254,334

[22] Filed: Oct. 6, 1988

[51] Int. Cl.⁵ .............................................. H02G 15/06
[52] U.S. Cl. ....................................... 174/87; 156/49; 174/74 A; 174/77 R
[58] Field of Search ................... 174/87, 74 A, 77 R; 156/49

[56] References Cited

U.S. PATENT DOCUMENTS

| | | | |
|---|---|---|---|
| 3,243,211 | 3/1966 | Wetmore | 287/78 |
| 3,283,059 | 11/1966 | Plummer | 174/38 |
| 3,297,819 | 1/1967 | Wetmore | 174/127 |
| 3,396,460 | 8/1968 | Wetmore | 29/859 |
| 3,769,443 | 10/1973 | Pierzchala et al. | 174/38 |
| 3,919,460 | 11/1975 | Neail et al. | 174/87 |
| 3,962,554 | 6/1976 | Eigel | 174/74 |
| 4,206,786 | 6/1980 | Wetmore | 174/DIG. 8 X |
| 4,221,924 | 9/1980 | Grabriel et al. | 174/74 A X |
| 4,399,602 | 8/1983 | Hancock et al. | 174/74 A X |
| 4,600,261 | 7/1986 | Debbaut | 439/521 |
| 4,610,738 | 9/1986 | Jervis | 156/49 |
| 4,634,207 | 1/1987 | Debbaut | 439/521 |
| 4,643,924 | 2/1987 | Uken et al. | 428/35.7 |
| 4,647,717 | 3/1987 | Uken | 174/84 C |
| 4,690,831 | 9/1987 | Uken et al. | 427/44 |
| 4,701,574 | 10/1987 | Shimirak etal. | 174/93 |
| 4,718,678 | 1/1988 | Vansant | 277/1 |
| 4,721,832 | 1/1988 | Toy | 174/74 A X |
| 4,737,600 | 4/1988 | Mathis et al. | 174/74 A X |

FOREIGN PATENT DOCUMENTS 2658266  7/1978  Fed. Rep. of Germany .... 174/77 R

Primary Examiner—Morris H. Nimmo
Attorney, Agent, or Firm—A. Stephen Zavell; Herbert G. Burkard

[57] ABSTRACT

The invention provides for a reusable telecommunications pedestal closure containing a water and oxygen impervious liner to minimize the oxygen and water degradation effects on the fine copper wires contained in a telecommunications splice between at least two telecommunications cables.

12 Claims, 1 Drawing Sheet

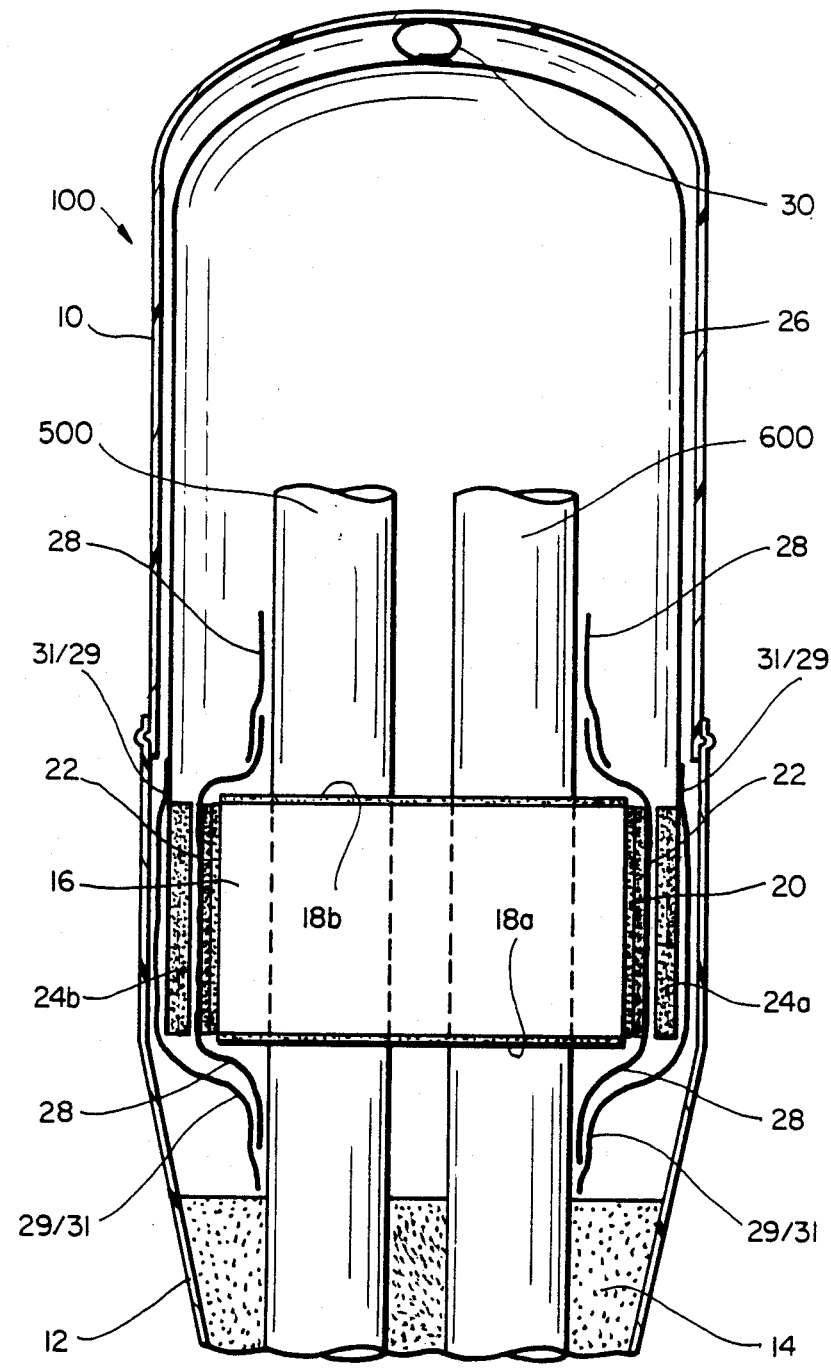
FIG_1

TELECOMMUNICATIONS PEDESTAL CLOSURE WITH ENVIRONMENTAL CONTROL LINER

FIELD OF THE INVENTION

This invention relates to telecommunications pedestal closures. More specifically, this invention relates to non-heat-shrink telecommunications pedestal closures. In particular, this invention relates to a reenterable non-heat-shrink telecommunications pedestal enclosure containing an oxygen and water environmental barrier liner.

BACKGROUND OF THE INVENTION

The telecommunications industry utilizes cables containing a plurality of finely insulated copper wires. These insulated copper wires carry the telecommunications signals. When it is necessary to connect an individual user into the telecommunicatons system, a drop wire from the user's house must go out to the main cable. To connect the plurality of homes at a given spot, the cable must be split open to expose the internal wires. Once exposed, these wires are subject to degradation and breaking unless environmentally protected. One way of protecting the cables is with a heat-shrinkable pedestal closure to surround the splice and the cable. This is an effective means of environmentally sealing the splice. However, many areas for reasons of safety or the surrounding environment do not permit an open torch to be used to seal the pedestal closure.

Thus, a non-heat-shrink closures devised to seal the cable would be desirable.

Non-sealed mechanical closures permit the fine copper insulated wires to be exposed to attacks by oxygen and moisture and/or water vapor. To prolong the lifetime of the fine copper wires it would be desirable of having a means for sealing the cable splice area without using mastics or other adhesives in the splice area which make reentry an extremely difficult and time consuming operation. Thus, it would be highly desirable to have an environmentally controlled liner capable of being sealed and unsealed and resealed in a facile manner.

SUMMARY OF THE INVENTION

The invention provides the previously recited desirable features as well as additional beneficial features readily apparent to the ordinary skilled artisan. The invention provides for an environmentally controlled liner fitted within a pedestal cap and capable of being sealed to the cable portions of a cable splice in a easily reenterable manner.

BRIEF DESCRIPTION OF THE DRAWING

FIG. 1 is a cross-sectional illustration of an embodiment of the invention.

DETAILED DESCRIPTION OF THE INVENTION

The invention will be more clearly illustrated by referring to FIG. 1. FIG. 1 illustrates a telecommunication pedestal closure 100 containing the environmental control liner 26. The enclosure 100 contains a reusable tubular molded cap 10 having a closed end and an open end opposite thereto for receiving the cable splice. The cap 10 contains the oxygen and water barrier liner 26 adhered thereto with an adhesive means such as a double stick type adhesive tape 30. The liner 26 is fused together on three sides forming a rectangular or cylindrical shaped bag. Thus the liner 26 will also be referred to herein as the bag 26. The bag mouth opening contains a compliant resealable sealing member 24 within the bag to form a seal to the cables as more fully described hereinafter.

Cable 500 a 600 containing the splice within the cap 10 not illustrated are sealed in the housing with an end piece base member 12 and sealing insert means such as foam inserts 14. The base member 12 preferably has clamshell-type halves which close together around the cables 500 and 600. Of course, a retaining means such as a rail, if the halves have a channel, retains the halves together. The rail permits facile reentry to the open base area of the cap 10.

Surrounding the cables 500 and 600 is a malleable splice core sealing means 16 such as mastic. More specifically, mastic is an adherent, cohesive sealing material intended to fill a gap between two components. A mastic can deform or yield plastically, that is, undergo viscous flow, both during application and in subsequent service at ambient temperatures. Mastics may consist of mixtures of substantially non-crystalline materials, for example, bituminous materials elastomers, or thermoplastic polymers, and may contain inert fibrous or powdered fillers. Examples of mastic materials are disclosed in U.S. Pat. Nos. 3,243,211; 3,297,819; 3,396,460; and 4,206,786, each patent is completely incorporated herein by reference for all purposes. Of course the mastic is optimized for the specific environment. A suitable method for determining the viscosity of mastics is set forth in ASTM D-3579 (Procedure A or B).

To preclude the mastic from entering the cable splice area or flowing down into the cap 10 the mastic 16 is coated with a restraining means such as foam sheets 18a and 18b. Adhered to the surface of the mastic not coated with foam 18a and 18b is a further sealing means having a non-tacky surface opposite to the tacky surface contacting the mastic 16 such as a rubber or foam-backed mastic tape comprising a mastic 20 in contact with the mastic 16 and a foam-backing 22 adhered thereto. The foam backing 22 provides a sealing means to seal to a reusable sealing means such as a gel seal 24 which maintains an environmental seal when pressure is applied thereto. Once this splice sealant core 16 is applied to the cables and the sealant strip 20/22 is applied thereto, the unit is inserted within the bag 26. The surface 22 seals to gel 24 under pressure through the further application of a pressure applying means such as polyvinyl chloride or other suitable tape such as Perma-Wrap ® tape.

More specifically, a suitable environmental liner film 26 comprises a layer of a tear resistant material such as crossplies of oriented HDPE high density polyethylene (HDPE). A suitable material is marketed under the tradename Valeron ® and a suitable thickness is about 3 thousands of an inch. However, any tear-resistant material is suitable for this purpose such as linear low density polyethylene, nylon, polypropylene, polyester sheets, i.e., (Mylar ®), and like. Bonded to the tear resistant material with a suitable adhesive about 1 thousands of an inch thick such as Surlyn ® adhesive is a thin-flexible moisture and oxygen barrier of aluminum foil about 0.00035 inches thick or other s oxygen-water barrier material. Finally, the liner 26 is completed with a second film of either HDPE or Surlyn ® film about 3 thousand of an inch thick adhering to the aluminum foil through about one thousands of an inch thick layer of a suitable adhesive such as a Surlyn ® adhesive. Although this particularly preferred construction has been specified, any moisture-oxygen barrier material having abrasion and tear resistance is suitable for use within the invention.

Although the gel strips 24a and 24b can be adhered to either surface, preferably, the bag is preferably formed by joining, i.e., welding, gluing, or bonding the Valeron ® sheet side together to form the bag. Thus, the gel strips 24a and 24b adhere to the, i.e., the aluminum/Surlyn ® layers are adjacent the cable splice. Of course the gel strips must adhere to the Valeron ® side if the aluminum side is joined together, i.e., the strips 24a and 24b must be adjacent the cables 500 and 600.

The sealing material strips 24a and 24b is preferably a gel or a gel-based material having a cone penetration of from about 50 to 350 ($10^{-1}$ mm) and an ultimate elongation of at least about 100% and preferable greater than about 200%. A suitable soft compliant sealing material is about a 1–2 inch wide and about a 0.040- to about 0.125-inch thick GelTek TM tape and more specifically GelTek TM 1000 Strip Tape, a product of the Raychem Corporation. Preferably the strips are about 1-inch wide and thicker than about 0.0625 inches. A preferred option is to further cure the surface skin of the gel for a lower cone penetration value and coat it with a nonstick powder such as talc, and the like. The gel tape is adhered to the film 26 through the use of an adhesive such as a silicone adhesive or similar material such as RTV ® silicone. Other suitable sealing under-pressure gels are described in U.S. Pat. Nos. 4,600,261; 4,610,738; 4,634,207; 4,643,924; 4,647,717; 4,690,831; 4,701,574; and 4,718,678, all of said patents completely incorporated herein by reference for all purposes.

When installing the tubular member 10 over and around the splice region, the individual cables 500 and 600 should be grounded with any suitable conductive grounding bar. The grounding bar will be sealed within sealing member 16 along with any individual small drop wire exiting the tubular dome 10. Preferably, the jackets of any cables or wires passing through or embedded in sealing member 16 are roughed up to ensure a good seal with the sealing member 16 and the sealant adhesive portion 20 of the sealant strip foam backed tape combination. The non-adhesive backing 22 not in contact with sealing means 24 are adhered to the cables 500 and 600 with a suitable adhesive means 28 such as electrical tape. When the splice is inserted into the tubular member 10, the resealable sealant means 24 contacts the non-adhesive backing 22 and the outer surface of bad 26, i.e., the Valeron ® side of this embodiment combination is wrapped with a pressure providing means 29 such as Perma-Wrap ® tape or other suitable means and sealed with a sealing means 31 such as black electrical tape, and the like.

The invention provides for a sealable nontorchable unit which inhibits the ingress of oxygen and moisture which can damage the fine copper wires contained within the cable. The invention is described with respect to particularly preferred embodiments. Modifications which would be obvious to one of ordinary skill in the art are contemplated to be within the scope of the invention.

We claim:

1. A telecommunications pedestal closure comprising:
   a reusable molded cap containing an environmental oxygen and water barrier liner adhered therein;
   sealing means for substantially permanently sealing the cable portions of a cable splice together having a cable splice there between, said sealing means capable of forming a resealable seal to the environmental oxygen and water barrier liner, said sealing means is within the reusable cap and liner;
   resealable sealing means for forming a seal between the environmental liner and the sealing means for sealing the cable portions of a splice together; and
   base means for sealing the reusable cap thereto.

2. The apparatus according to claim 1 wherein the sealing means for sealing the two cables together is mastic having foam faces to preclude the flow thereof into the splice region or out of the base means.

3. The apparatus according to claim 2 further comprising a mastic tape having a non-adhesive backing, the mastic portion in contact with the mastic which contacts the cables and the non-adhesive backing in contact with a resealable sealing means for forming a seal between the non-adhesive backing and the environmental liner.

4. The apparatus according to claim 3 wherein the resealable sealing means is a gel maintained under compression by a pressure maintaining means for maintaining the gel under compression and in contact with the non-adhesive backing and the environmental liner.

5. The apparatus according to claim 4 wherein the environmental liner is a plastic metal laminate bag.

6. The apparatus according to claim 5 wherein the pressure maintaining means is a non-adhesive polyvinyl chloride tape.

7. A method of environmentally sealing a telecommunications cable within a reenterable telecommunications pedestal comprising:
   providing substantially permanent sealing means on adjacent portions of a cable having a splice therebetween;
   contacting the substantially permanent sealing means with a non-adhesive but substantially oxygen and water impervious material;
   removably sealing an oxygen and water impervious bag to the non-adhesive material with a gel under pressure; and
   pressuring the oxygen and water barrier having the gel therebetween.

8. The method according to claim 7 wherein the substantially permanent sealing means is a mastic and the oxygen and water impervious bag is a metal plastic laminate bag.

9. The method according to claim 8 wherein the removably sealing gel is a gel selected from the group consisting of a silicone gel, a kraton gel, a urethane gel, or mixtures thereof.

10. A telecommunications pedestal kit-of-parts for a telecommunications splice comprising:
    a reusable molded cap containing a water/oxygen impervious liner therein;
    a sealant core piece capable of sealing two spliced cables;
    a sealant strip capable of wrapping around the sealing core piece and providing a non-adhesive surface capable of contacting a gel seal contained on the surface of said liner; and
    an end piece capable of sealing the major portions of the cable below the reusable molded cap.

11. The kit according to claim 10 wherein the sealant core piece comprises a mastic core piece capable of sealing a plurality of cables.

12. The kit according to claim 11 further comprising a non-adhesive pressure maintaining tape.

* * * * *